(12) United States Patent
Kuehner et al.

(10) Patent No.: US 9,768,606 B2
(45) Date of Patent: Sep. 19, 2017

(54) METHOD AND DEVICE FOR DISCHARGING A HIGH-VOLTAGE SYSTEM

(75) Inventors: Jochen Kuehner, Backnang (DE); Martin Trunk, Moeglingen (DE); Arnold Winter, Filderstadt (DE); Dragan Mikulec, Vienna (AT)

(73) Assignee: ROBERT BOSCH GMBH, Stuttgart (DE)

( * ) Notice: Subject to any disclaimer, the term of this patent is extended or adjusted under 35 U.S.C. 154(b) by 2039 days.

(21) Appl. No.: 12/866,517

(22) PCT Filed: Dec. 30, 2008

(86) PCT No.: PCT/EP2008/068337
§ 371 (c)(1),
(2), (4) Date: Dec. 9, 2010

(87) PCT Pub. No.: WO2009/106187
PCT Pub. Date: Sep. 3, 2009

(65) Prior Publication Data
US 2011/0093148 A1    Apr. 21, 2011

(30) Foreign Application Priority Data

Feb. 25, 2008  (DE) ........................ 10 2008 010 980

(51) Int. Cl.
*H02H 3/14*  (2006.01)
*B60L 3/00*  (2006.01)
*B60L 3/04*  (2006.01)
*H02M 1/32*  (2007.01)

(52) U.S. Cl.
CPC ............ *H02H 3/14* (2013.01); *B60L 3/0046* (2013.01); *B60L 3/0053* (2013.01); *B60L 3/04* (2013.01); *H02M 1/32* (2013.01); *H02M 2001/322* (2013.01); *Y02T 10/7258* (2013.01); *Y02T 90/34* (2013.01)

(58) Field of Classification Search
CPC ....... H02H 3/14; B60L 3/0046; B60L 3/0053; B60L 3/04; Y02T 10/7258; Y02T 90/34; H02M 1/32
USPC ............... 701/22, 36, 41, 29.1; 318/798–801
See application file for complete search history.

(56) References Cited

U.S. PATENT DOCUMENTS

| 4,545,464 A | 10/1985 | Nomura |
| 4,628,395 A * | 12/1986 | Sugishima ...................... 361/18 |
| 4,967,133 A * | 10/1990 | Hasegawa ...................... 318/798 |
| 5,241,255 A * | 8/1993 | Oshima et al. ............... 318/801 |
| 8,207,631 B2 * | 6/2012 | Jahkonen ........................ 307/64 |
| 2008/0011528 A1 * | 1/2008 | Verbrugge et al. .......... 180/65.2 |

FOREIGN PATENT DOCUMENTS

EP  1 110 773  6/2001

* cited by examiner

*Primary Examiner* — Richard Camby
(74) *Attorney, Agent, or Firm* — Norton Rose Fulbright US LLP; Gerard Messina

(57) ABSTRACT

A method for discharging a high-voltage system in a vehicle, the high-voltage system having at least one energy store and a plurality of high-voltage consumers. To discharge the high-voltage system, the electrical energy store is first separated from the rest of the vehicle electrical system, and at least one of the high-voltage consumers is switched on, so that the charge stored within the system drains via the consumers.

8 Claims, 1 Drawing Sheet

METHOD AND DEVICE FOR DISCHARGING A HIGH-VOLTAGE SYSTEM

FIELD OF THE INVENTION

The present invention relates to a method for discharging a high-voltage vehicle electrical system, to a control device, and to a vehicle having a high-voltage vehicle electrical system.

BACKGROUND INFORMATION

The electrical-system voltage in most conventional vehicles amounts to 14V. In hybrid vehicles or vehicles having an electrical drive, however, voltages that may rise to several hundred volts are used. Voltages higher than 60 Volts are referred to as "high voltages".

For safety-related reasons, high-voltage vehicle electrical systems must be able to be switched off and discharged. Known high-voltage vehicle electrical systems include an active discharge device for this purpose. This device is usually made up of a two-pole main switch for cutting the battery off from the rest of the vehicle electrical system, and also a switchable resistor, via which the charge is able to be reduced. As an alternative, a passive discharge device may be used as well. This device is generally made up of at least one resistor, which is connected in parallel with the energy store and the high-voltage vehicle electrical system. One disadvantage of the known switch-off and discharge device is that the resistor must have a very large size relative to its capacity and thus requires relatively much space if discharge times of less than five seconds are to be realized. The discharge time that is achievable with the aid of such a known switch-off and discharge device is usually at least 60 seconds and thus quite long.

SUMMARY OF THE INVENTION

Therefore, it is an object of the present invention to provide a method and a device by which an electrical high-voltage system is able to be discharged in a rapid and safe manner.

One important aspect of the present invention is that the electrical energy store is separated from the remaining system and at least one of the high-voltage consumers connected to the high-voltage system is switched on in order to reduce the charge stored within the system. In the most optimal case, the (switchable) resistor mentioned in the introduction may be dispensed with completely. If a switchable resistor is provided nevertheless, it may either have slightly smaller dimensions than was previously the case, so that less space is required, or it remains the way it is and serves as redundant switch-off and discharge device and thereby enhances the high-voltage safety. Because of the parallel connection of high-voltage consumers and resistors, the charge stored in the system is able to be reduced much more quickly.

According to one preferred specific embodiment of the present invention, a plurality of high-voltage consumers—or preferably, all—is/are switched on simultaneously. This makes it possible to achieve an even more rapid discharge of the system.

If a switchable resistor is provided as discharge circuit, then the high-voltage consumer(s) and the resistor is/are preferably switched on at the same time.

In general, high-voltage consumers are all consumers connected within the high-voltage system, such as a climate-control compressor, a DC/DC converter, or an electrical steering aid.

Preferably, a control device is provided for the purpose of switching the high-voltage consumers and possibly the additional discharge circuit on and off, the control device being connected to the associated switching units of the individual components.

The switch-off and discharge process is preferably performed following the action of switching off the vehicle ignition, a collision of the vehicle, or prior to performing servicing procedures.

The afore-described method is used for hybrid vehicles, in particular, but may also be used for electric vehicles and fuel cell vehicles.

DETAILED DESCRIPTION

Figure 1:
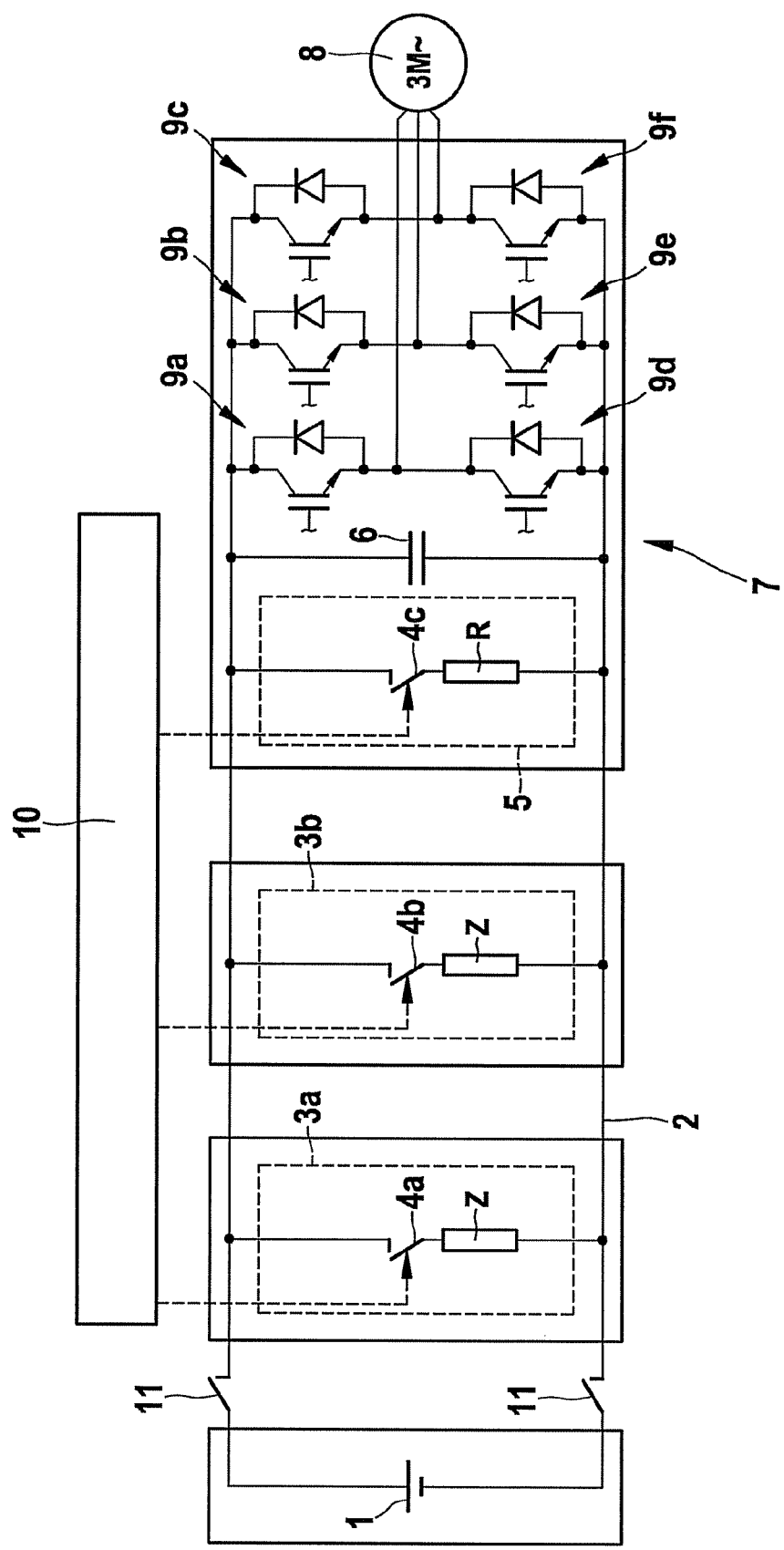
FIG. 1 shows a schematic representation of a high-voltage system.

FIG. 1 shows a simplified representation of a high-voltage vehicle electrical system as it may be used in hybrid vehicles, for example. The voltage of high-voltage system 2 could be 300 Volt, for example. High-voltage vehicle electrical system 2 is equipped with a high-voltage battery 1, a plurality of high-voltage consumers 3a, 3b, a rectifier 7 having an intermediate circuit capacitor 6, and an electrical machine 8. The output stage switches, including the free-wheeling diode of rectifier 7, are denoted by reference numerals 9a-9f. Additional intermediate circuit capacitors, which likewise must be discharged, may be located in 3a, 3b.

In order to reduce the charge stored in system 2 and in intermediate circuit capacitor 6, in particular, a switchable resistor 5 is provided, which is connected in parallel to intermediate circuit capacitor 6. In this specific embodiment, switchable resistor 5 is integrated in rectifier 7, but it could also be connected at some other location.

In a situation in which the charge in the high-voltage vehicle electrical system is to be reduced, battery 1 is first separated from the rest of the vehicle electrical system with the aid of switches 11. In the exemplary embodiment shown, a separate switch 11 is provided in both connection leads of battery 1. Then, resistor 5 and, simultaneously, one or more high-voltage consumers 3a, 3b are switched on. The charge stored in vehicle electrical system 2 and, in particular, in intermediate circuit capacitor 6, is reduced very rapidly by impedances Z which are switched in parallel. This makes it possible to achieve discharge times of less than 5 s, or even less than 1 s, depending on the design of the vehicle electrical system.

Basically, all consumers connected to high-voltage system 2 may be used as high-voltage consumers. Consumer 3a, for example, may be a climate-control compressor. Consumer 3b could be a DC/DC converter, for instance.

Switches 4a-4c of individual consumers 3a, 3b and resistor 5 are connected to a control device 10 and are switched on by the control device at the time when the discharge commences.

What is claimed is:

1. A method for discharging a high-voltage onboard vehicle electrical system having at least one energy store and a plurality of high-voltage consumers, the method comprising:
   electrically separating the energy store from the rest of the vehicle electrical system; and
   switching on at least one of the high-voltage consumers in order to reduce a charge stored in the vehicle electrical system;
   wherein the high-voltage consumers include a DC/DC converter.

2. The method according to claim 1, wherein a plurality of high-voltage consumers are switched on simultaneously.

3. The method according to claim 1, wherein, using an additional discharge circuit, at least one of the high-voltage consumers is switched on simultaneously in order to reduce the charge stored in the vehicle electrical system.

4. The method according to claim 1, further comprising discharging the high-voltage vehicle electrical system, one of (a) following an action of switching off a vehicle ignition, (b) following a collision of the vehicle, and (c) prior to performing servicing procedures.

5. A control device for discharging a high-voltage onboard vehicle electrical system having at least one energy store and a plurality of high-voltage consumers, the control device comprising:
   means for electrically separating the energy store from the rest of the vehicle electrical system; and
   means for switching on at least one of the high-voltage consumers in order to reduce a charge stored in the vehicle electrical system;
   wherein the high-voltage consumers include a DC/DC converter.

6. A vehicle comprising:
   a high-voltage vehicle electrical system, which includes at least one energy store, a plurality of switchable high-voltage consumers, and at least one control device, the control device electrically separating the energy store from the rest of the vehicle electrical system when a discharge request is received, the control device switching on at least one of the high-voltage consumers in order to reduce a charge stored in the vehicle electrical system;
   wherein the high-voltage consumers include a DC/DC converter.

7. The vehicle according to claim 6, wherein the high-voltage consumers include a climate-control compressor.

8. The vehicle according to claim 6, wherein the high-voltage consumers include an electrical steering aid.

* * * * *